(12) United States Patent
Jayachandran et al.

(10) Patent No.: US 8,922,482 B2
(45) Date of Patent: Dec. 30, 2014

(54) METHOD FOR CONTROLLING A DISPLAY APPARATUS USING A CAMERA BASED DEVICE AND MOBILE DEVICE, DISPLAY APPARATUS, AND SYSTEM THEREOF

(71) Applicant: Samsung Electronics Co., Ltd., Suwon-si (KR)

(72) Inventors: Prasanth Jayachandran, Noida (IN); Muthukumar Subramanian, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 13/888,911

(22) Filed: May 7, 2013

(65) Prior Publication Data

US 2013/0293458 A1 Nov. 7, 2013

(30) Foreign Application Priority Data

May 7, 2012 (IN) .............................. 1756/CHE/2012
Apr. 9, 2013 (KR) ......................... 10-2013-0038759

(51) Int. Cl.
*G09G 5/00* (2006.01)
*G06F 3/01* (2006.01)
*G06F 1/16* (2006.01)
*G06F 3/14* (2006.01)

(52) U.S. Cl.
CPC .............. *G06F 3/017* (2013.01); *G06F 1/1694* (2013.01); *G06F 3/1462* (2013.01); *G06F 2200/1637* (2013.01); *G09G 2320/0693* (2013.01); *G09G 2340/0492* (2013.01); *G09G 2370/02* (2013.01); *G09G 2370/22* (2013.01)
USPC ........................... 345/156; 345/158; 345/169

(58) Field of Classification Search
CPC ............ G06F 3/017; G06F 2200/1637; G06F 1/1694; G06F 3/14; G06F 3/01; G06K 9/00355; G06K 9/00375
USPC .................................. 345/156–169, 204–215
See application file for complete search history.

(56) References Cited

U.S. PATENT DOCUMENTS 7,607,111 B2   10/2009   Vaananen et al.
2002/0167699 A1   11/2002   Verplaetse et al.
(Continued)

FOREIGN PATENT DOCUMENTS

KR   102011007437 A   1/2011
KR   10-2011-0055868 A   5/2011

OTHER PUBLICATIONS

International Search Report dated Aug. 27, 2013 from the International Searching Authority in counterpart application No. PCT/KR2013/003939.

(Continued)

*Primary Examiner* — Vijay Shankar
(74) *Attorney, Agent, or Firm* — Sughrue Mion, PLLC

(57) ABSTRACT

A method of controlling a display apparatus using a camera based device and a mobile device, display apparatus, and system applying the same are provided. The method for controlling the display apparatus with the mobile device includes capturing an entity displayed which is on the display apparatus, in response to a movement of the mobile device, sensing at least one of a movement and a change of size of the captured entity, generating a control signal for controlling the display apparatus based on at least one of the sensed movement, and change of size of the entity and transmitting the generated control signal to the display apparatus.

17 Claims, 11 Drawing Sheets

(56) References Cited

U.S. PATENT DOCUMENTS

| | | | |
|---|---|---|---|
| 2003/0229900 A1* | 12/2003 | Reisman | ................ 725/87 |
| 2008/0062001 A1 | 3/2008 | Hsu et al. | |
| 2008/0242415 A1 | 10/2008 | Ahmed | |
| 2009/0036323 A1 | 2/2009 | van Eijk et al. | |
| 2009/0051648 A1 | 2/2009 | Shamaie et al. | |
| 2009/0198359 A1* | 8/2009 | Chaudhri | ................ 700/94 |
| 2010/0042594 A1 | 2/2010 | Larsson et al. | |
| 2010/0257473 A1 | 10/2010 | Kang | |
| 2010/0306699 A1 | 12/2010 | Hsu et al. | |
| 2011/0010607 A1 | 1/2011 | Raveendran | |
| 2011/0316697 A1 | 12/2011 | Krahnstoever et al. | |

OTHER PUBLICATIONS

Written Opinion dated Aug. 27, 2013 from the International Searching Authority in counterpart application No. PCT/KR2013/003939.

* cited by examiner

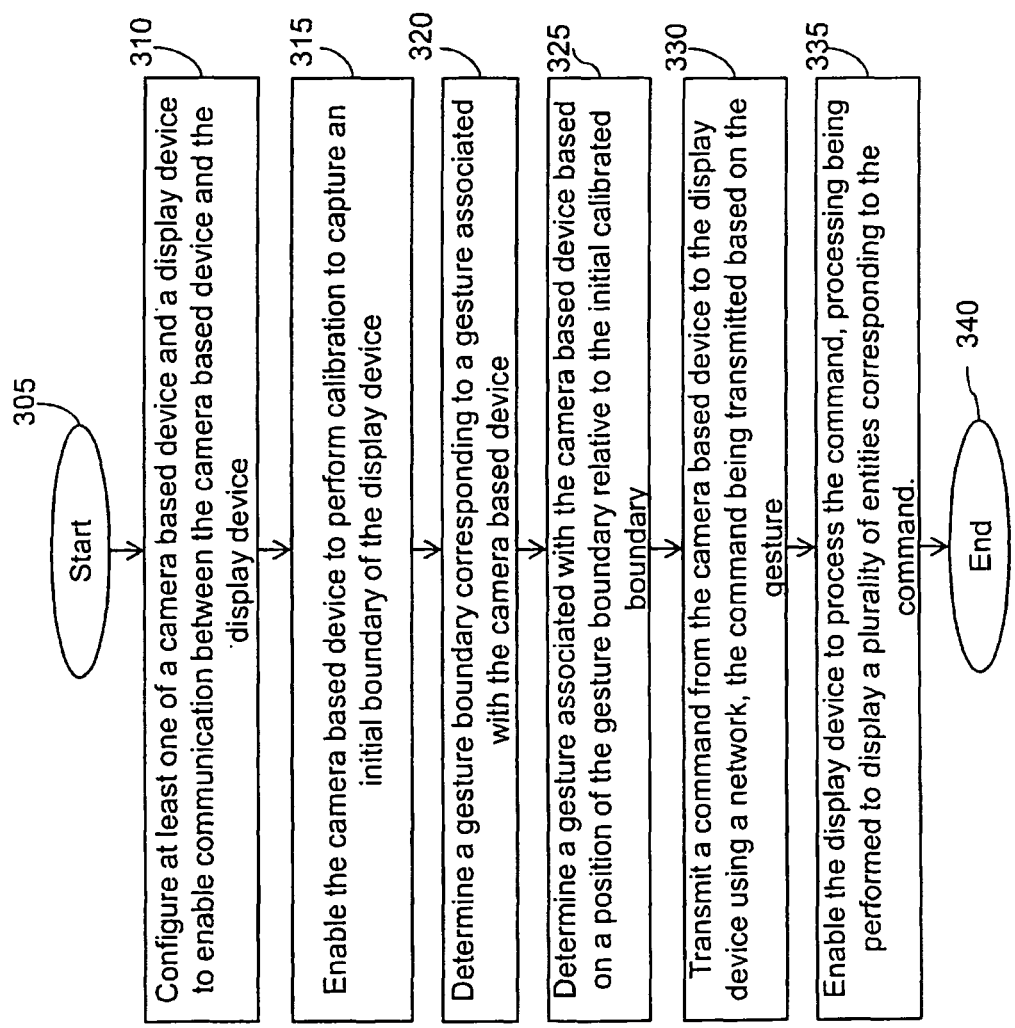

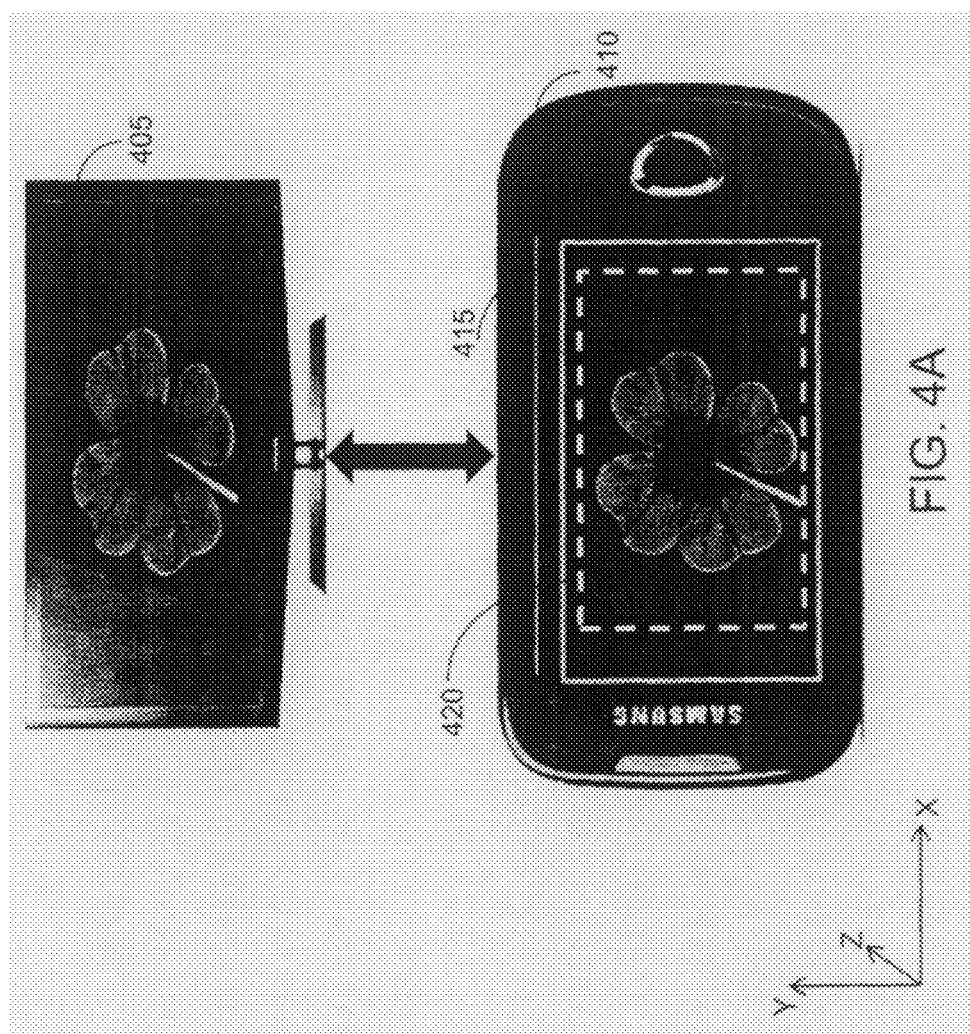

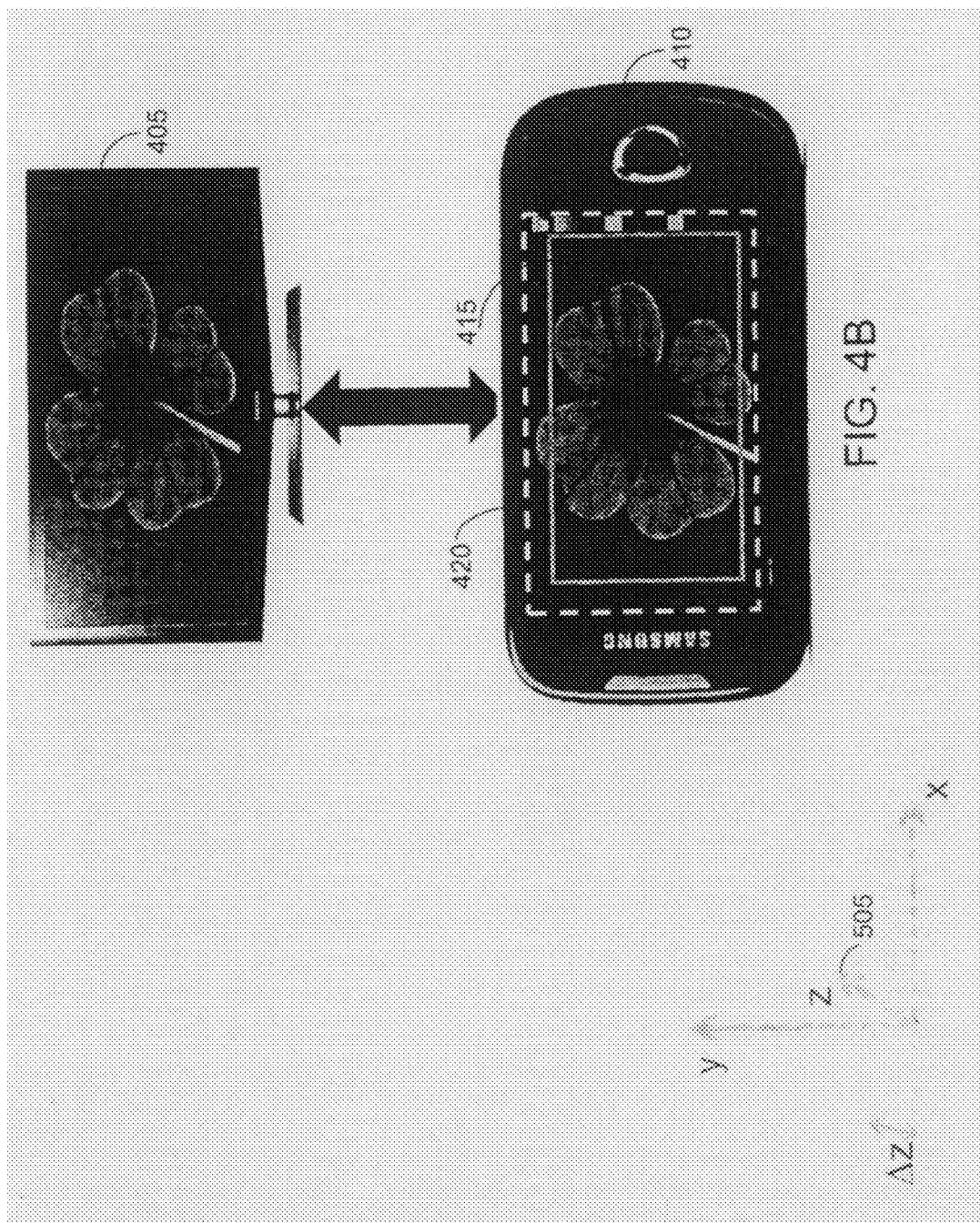

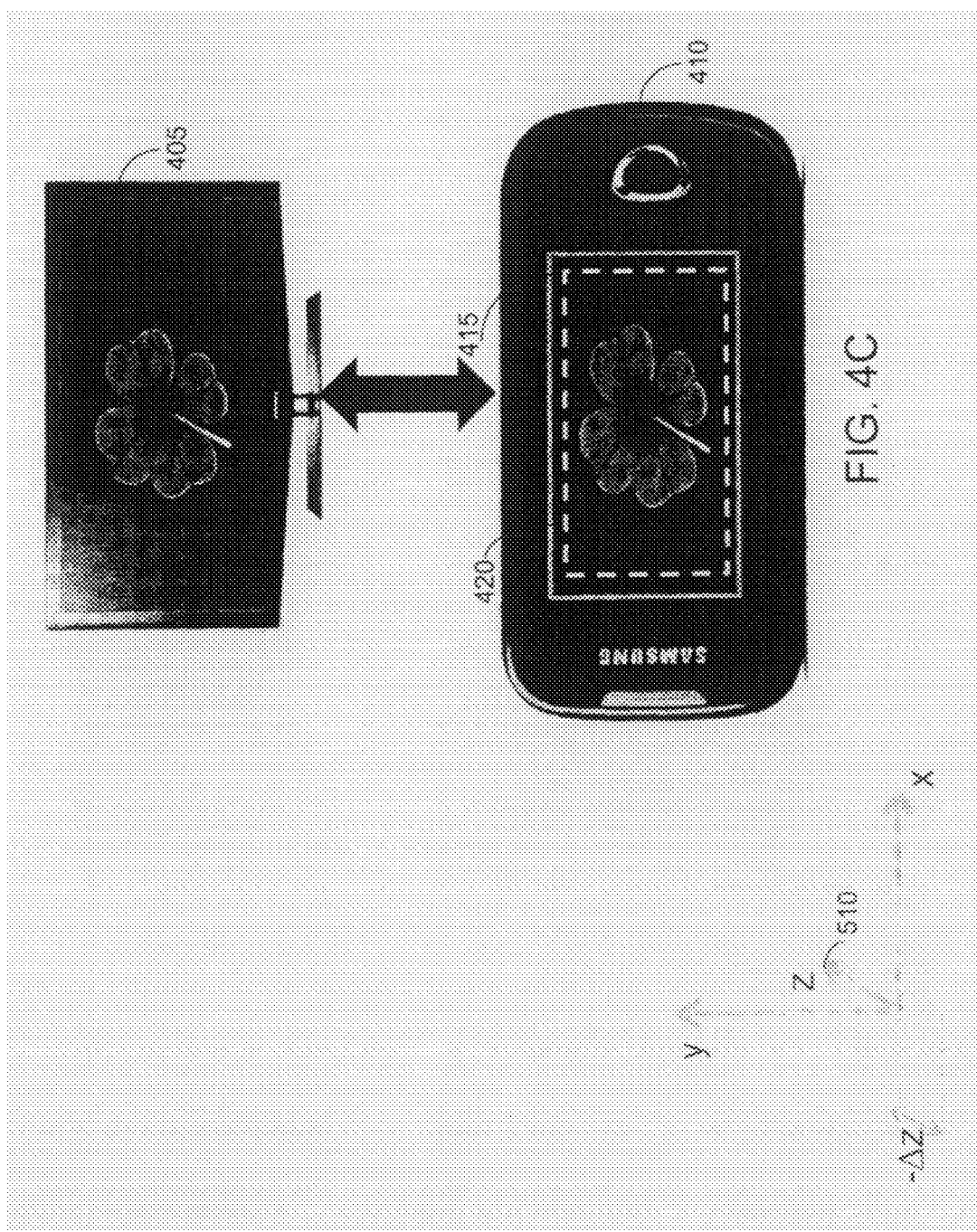

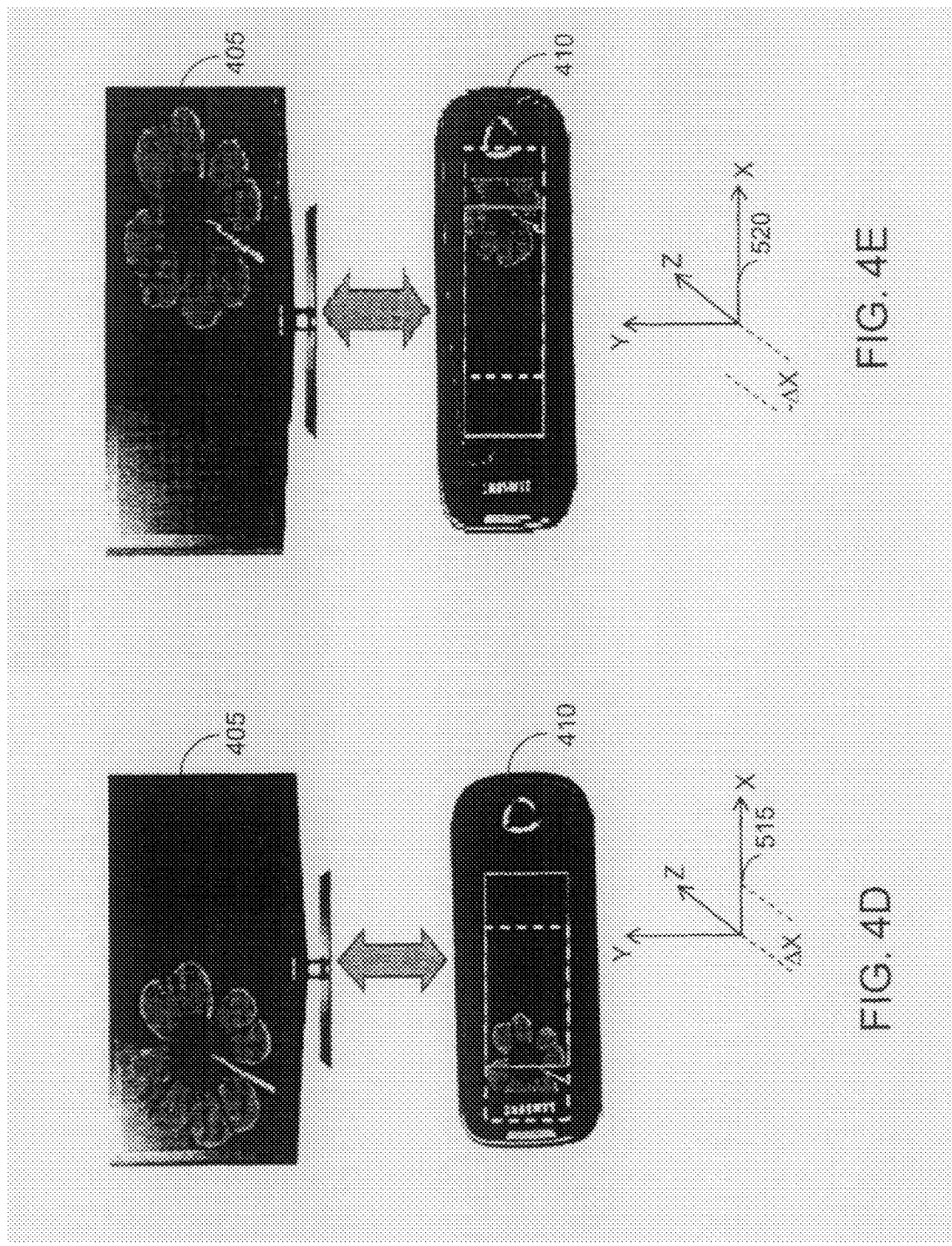

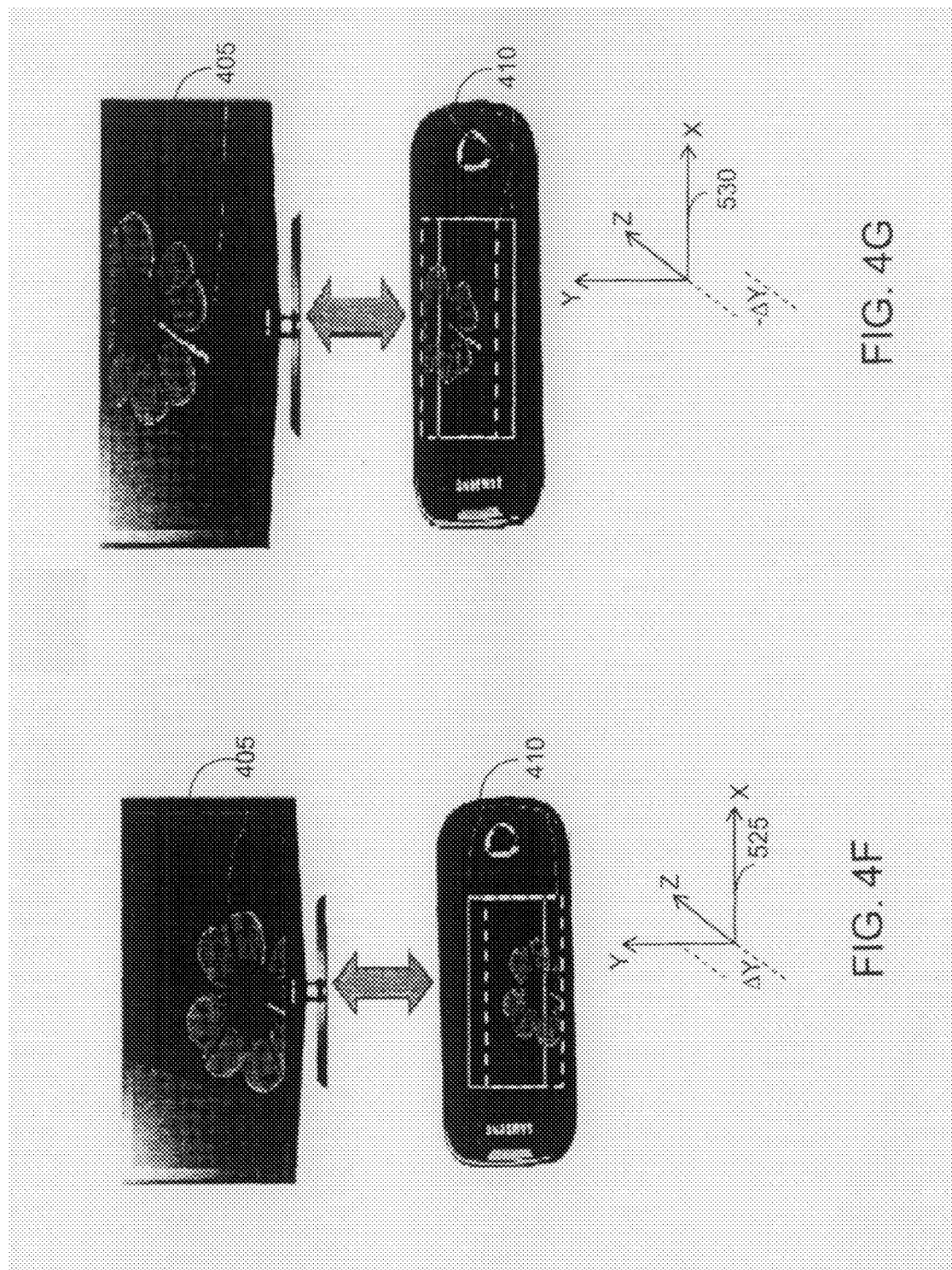

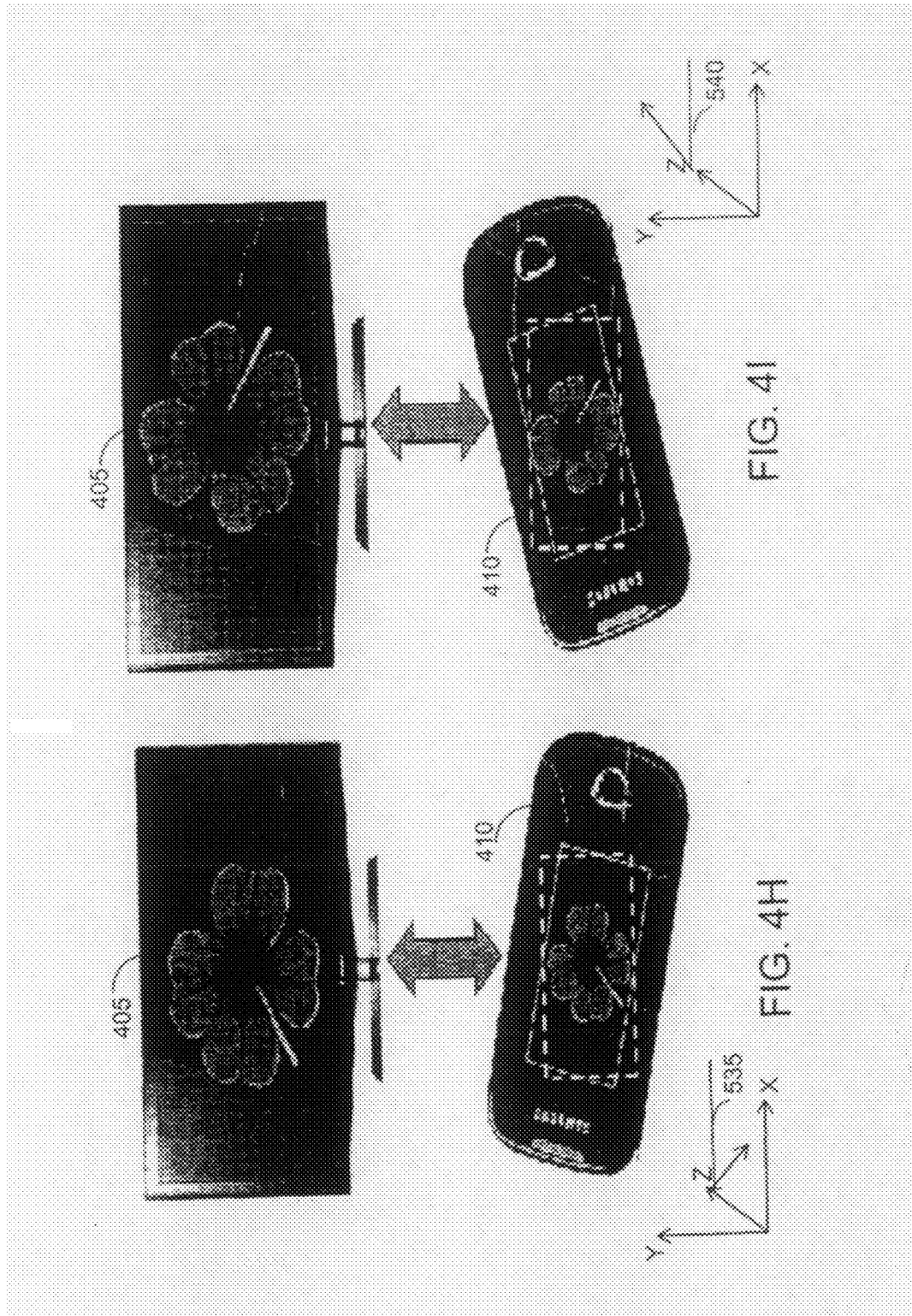

METHOD FOR CONTROLLING A DISPLAY APPARATUS USING A CAMERA BASED DEVICE AND MOBILE DEVICE, DISPLAY APPARATUS, AND SYSTEM THEREOF

CROSS-REFERENCE TO RELATED APPLICATIONS

This application claims priority from Indian Patent Application No. 1756/CHE/2012, filed on May 7, 2012, in the Indian Patent Office, and the Korean Patent Application No. 10-2013-0038759, filed on Apr. 9, 2013, in the Korean Intellectual Property Office, the disclosures of which is incorporated herein by reference in their entirety.

BACKGROUND

1. Field

Methods and apparatuses consistent with exemplary embodiments relate to a mobile device, display apparatus, system and control method thereof, and more particularly to a method of controlling a display apparatus using a camera based device, mobile apparatus, display apparatus and system applying the same.

2. Description of the Related Art

Mobile devices, for example, mobile phones, personal digital assistants (PDAs) and other hand held devices are becoming increasingly popular for entertainment purposes, for example games, watching television programs on mobile phones and the like. Input devices, for example, but not limited to, input buttons of the mobile device, a pointing device and a joystick can be used for providing inputs and for controlling the mobile devices. However, the input devices are miniaturized in nature and hence a user cannot conveniently provide the inputs. Further, the display associated with the mobile device is also miniaturized in nature and hence the user cannot view images displayed on the mobile devices distinctly. Further, there exist one or more circumstances where a user wishes to view content of display device through a mobile device and further control the display device using the mobile device.

Related art techniques aim to select an input value based on a motion sensed by, for example, a sensor embedded on a handheld device. The motion sensed is used to vary a position of a graphical element displayed on the handheld device. The position of the graphical element is thus used to identify the input value. The input value may be used to perform a function on the handheld device or an external device. In one example, the input value may be used for opening a lock. In another example, the input value may be used for retaining an image displayed on the handheld device. However, as mentioned above, the input is provided in the form of the motion and, therefore, an additional device, for example, a sensor is used for sensing the motion.

In another related art technique, a motion sensor is coupled to a device and provides a motion signal corresponding to movement of the device. The technique further includes a processor to process the motion signal. The motion signal is referred to as an input to the processor. Processing includes identifying either a tap command or a position command associated with the motion signal. If the processor identifies the tap command, then one or more actions, responsive to the tap command, are performed by the processor. Further, if the processor identifies the position command, then one or more actions, responsive to the position command, for example, controlling and operating the device is performed by the processor. However, in this technique, an additional device, for example, the motion sensor is used for sensing the input. Further, a processor is used for processing the input.

In the light of the foregoing discussion, there is a need for a system and a method for distinctly viewing and controlling a display device using a single input device.

SUMMARY

Exemplary embodiments provide a method for sensing a movement of an entity or image captured by a camera based device and for controlling a display apparatus, and may provide a mobile device, display apparatus, and system applying the same.

According to an aspect of an exemplary embodiment, there is provided a method for controlling a display apparatus with a mobile device, the method including: capturing an entity which is displayed on the display apparatus; in response to a movement of the mobile device, sensing at least one of a movement of the captured entity and a change of size of the captured entity; generating a control signal for controlling the display apparatus based on the at least one of the movement of the captured entity and the change of size of the sensed entity; and transmitting the generated control signal to the display apparatus.

The capturing the entity may include displaying an initial calibration gradation line; and displaying a gesture gradation line associated with the entity displayed on the display apparatus.

The method may further include moving the gesture gradation line according to the movement of the mobile device.

The method may further include determining, using the sensed information, at least one of the movement and a change of size of the gesture gradation line as it relates to the initial calibration gradation line.

The method may further include in response to the size of the captured entity being changed, changing with the control signal a size of the entity displayed on the display apparatus according to the change of the size of the captured entity; and in response to a position of the captured entity being changed, changing with the control signal a position of the entity displayed on the display apparatus according to the change of the position of the captured entity.

The method may further include in response to the size of the captured entity being increased according to the movement of the mobile device towards the display apparatus, increasing with the control signal the size of the entity displayed on the display apparatus; and in response to the size of the captured entity being decreased according to the movement of the mobile device away from the display device, decreasing with the control signal the size of the entity displayed on the display apparatus.

The control signal may cause the entity displayed on the display apparatus to move in a direction which is opposite to the movement of the gesture gradation line as it relates to the initial calibration gradation line.

The entity displayed on the display apparatus may include a pointer.

According to an aspect of another exemplary embodiment, there is provided a mobile device for controlling a display apparatus, the mobile device including: a camera which is configured to capture an entity displayed on the display apparatus; a display which is configured to display the entity captured by the camera; a communicator which is configured to communicate with the display apparatus; and a controller which controls the camera to capture the entity displayed on the display apparatus, sense a movement of the captured entity according to a movement of the mobile device, generate a control signal based on the sensed movement of the captured entity, and control the communicator to transmit the generated control signal to the display apparatus.

The controller may control the display to display an initial calibration gradation line and a gesture gradation line, the gesture gradation line being associated with the entity displayed on the display while the camera captures the entity of the display apparatus.

The gesture gradation line may move according to a movement of the mobile device.

The controller may determine at least one of the movement and a change of size of the gesture gradation line of the initial calibration gradation line in order to sense at least one of the movement and change of size of the captured entity.

The controller may generate the control signal in response to the size of the captured entity being changed, to change a size of the entity displayed on the display apparatus according to the change of the size of the captured entity, and in response to the position of the captured entity being changes, to change a position of the entity displayed on the display apparatus according to the change of the size of the captured entity.

The controller may generate the control signal in response to the size of the captured entity being increased according to the movement of the mobile device towards the display apparatus, to increase the size of the entity displayed on the display apparatus, and in response to the size of the captured entity being decreased according to the movement of the mobile device away from the display apparatus, to decrease the size of the entity displayed on the display apparatus.

The controller may generate the control signal to move the entity displayed on the display apparatus in a direction which is opposite to the movement of the gesture gradation line as it relates to the initial calibration gradation line.

The entity displayed on the display apparatus may include a pointer.

According to an aspect of another exemplary embodiment, there is provided a method of controlling a display apparatus controlled by a mobile device, the method including displaying an entity; receiving, from the mobile device, a control signal which is generated based a movement of the mobile device relative to the display apparatus, the control signal indicating a movement of the displayed entity as it relates to the movement of the mobile device; and controlling at least one of a size and a position of the displayed entity according to the control signal.

According to an aspect of another exemplary embodiment, there is provided a method of controlling a display apparatus of a system which includes a mobile device and display apparatus, the method including: displaying an entity using the display apparatus; capturing the entity displayed on the display apparatus using the mobile device; sensing information using the mobile device, the sensed information including at least one of a movement and a change of size of the captured entity according to a movement of the mobile device; generating a control signal using the mobile device based on the sensed information, the control signal controlling the display apparatus; and controlling, according to the control signal, at least one of the size and position of the displayed entity using the display apparatus.

According to an aspect of another exemplary embodiment, there is provided a device including: a display configured to display a first image which is a mirror image of a second image displayed on the second device; a sensor configured to sense a movement of the device relative to the second device; a processor configured to generate a control signal for controlling the second device to move the second image in response to the sensor sensing the movement of the device; and a transmitter for transmitting the control signal to the second device.

BRIEF DESCRIPTION OF THE DRAWINGS

The above and/or other aspects of the present disclosure will be more apparent by describing certain exemplary embodiments with reference to the accompanying drawings, in which:

FIG. 3 is a flowchart illustrating a method of controlling a display device using a camera based device, in accordance with an exemplary embodiment;

FIG. 4A-4I is an exemplary illustration of controlling a display device using a mobile phone, in accordance with an exemplary embodiment;

DETAILED DESCRIPTION

Certain exemplary embodiments are described in greater detail below with reference to the accompanying drawings.

It should be observed the method steps and system components have been represented by conventional symbols in the figures, showing only specific details which are relevant for an understanding of the present disclosure. Furthermore, for purposes of clarity, details that are readily apparent to person ordinarily skilled in the art may not be described herein. In the present disclosure, relational terms such as first and second, and the like, may be used to distinguish one entity from another entity, without necessarily implying any actual relationship or order between such entities.

Exemplary embodiments described herein provide a system and a method of controlling a display device using a camera based device. As used herein, the terms "display device" and "display apparatus" will be used interchangeably.

Figure 1:
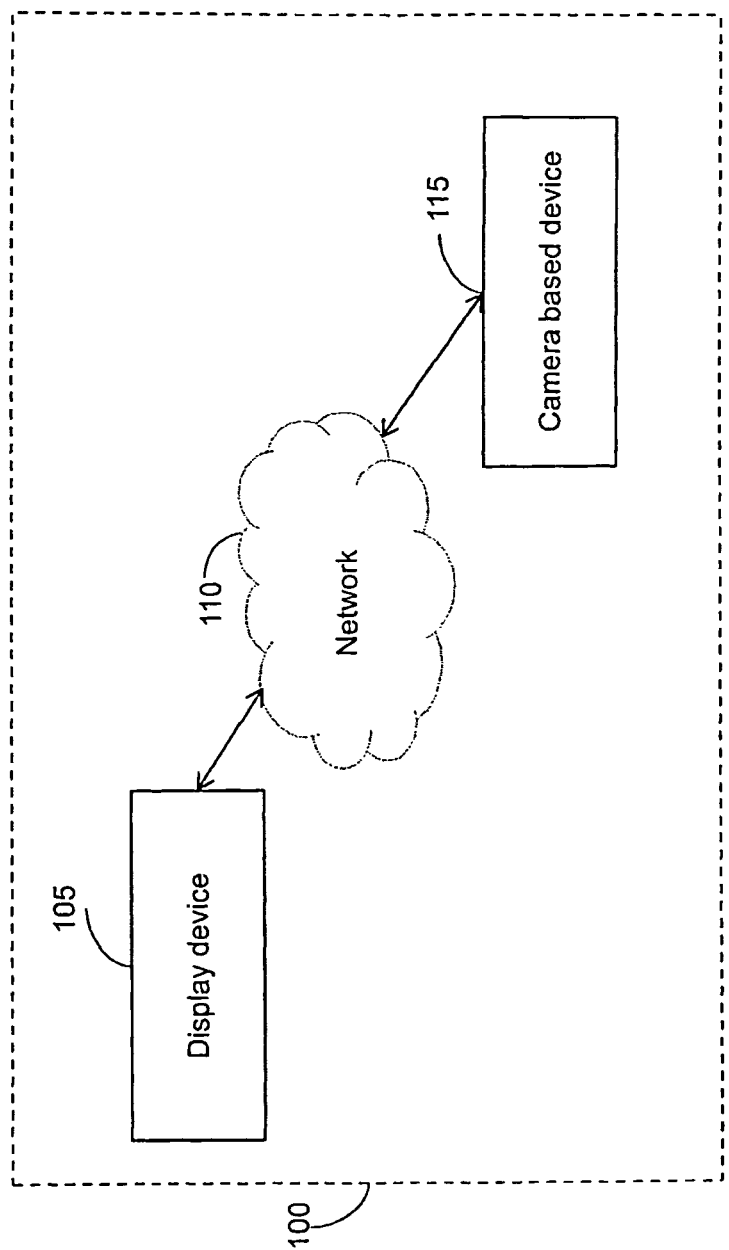
FIG. 1 is a block diagram of a system for controlling a display device using a camera based device, in accordance with an exemplary embodiment.

FIG. 1 is a block diagram of a system 100 for controlling a display device using a camera based device, in accordance with one embodiment. The system 100 includes a display device 105, a network 110 and a camera based device 115. The display device 105 can also be embodied as an electronic device configured with a display feature. Examples of the display devices 105 include, but are not limited to, televisions, mobile phones, computers, laptops, handheld devices personal digital assistants (PDA), tablet computers, and telecommunication devices. Examples of the network 110 include, but are not limited to, local area network (LAN), wide area network (WAN) and wireless networks. The camera based device 115 includes a camera and is operable to capture entities using the camera. As used herein, capturing entities may include capturing still images as well as capturing video images of the entity. Examples of the camera based device 115 include, but are not limited to, a mobile phone including a camera, a digital camera, webcam and other electronic devices embedded with a camera.

The display device 105 is operable to display one or more entities included in a video stream or contents included in an application running on the display device 105. The camera based device 115 is configured to capture the entities displayed. Further, the camera based device 115 moves towards one or more directions with respect to a position of the display device 105. In response to moving, the camera based device 115 generates a command corresponding to a direction moved. Further, camera based device 115 can be rotated in a clockwise and counterclockwise directions with respect to the position of the display device 105. Further, in response to rotating, the camera based device 115 generates a command corresponding to rotation of the camera based device 115, which is transmitted to the display device 105. Transmission of the command may be performed using various networks, for example, but not limited to, wireless networks such as Bluetooth, wireless USB, NFC, Wi-Fi and the like.

The display device 105 is configured to receive the command transmitted by the camera based device 115. Upon receiving the command, the entities captured by the camera based device 115 and displayed on the display device 105, are moved in response to the command. For example, the entities may be moved on the display device 205 towards the right, the left, the top, the bottom, or any diagonal thereof. Further, the entities may be rotated in a clockwise direction or a counterclockwise direction. Thus the entities are moved and displayed on the display device 105 for viewing by a user. Hence, the camera based device 115 can be used for controlling the movement of entities displayed on the display device 105.

Figure 2:
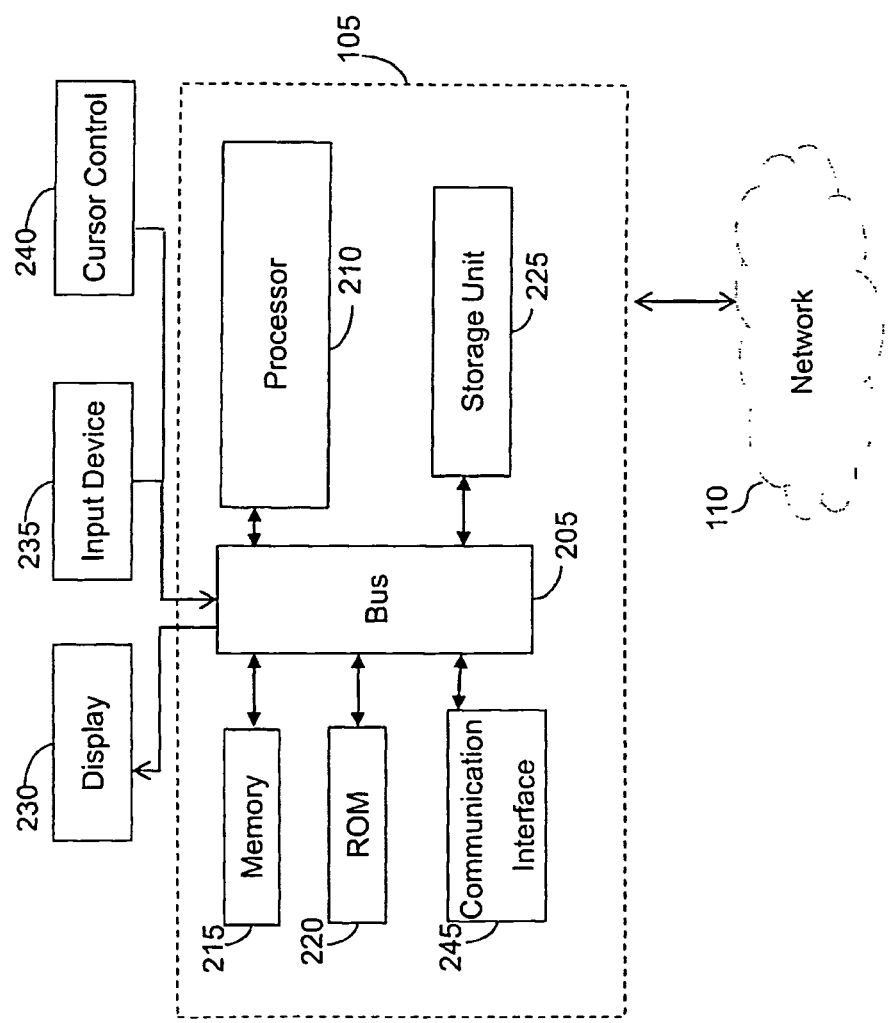
FIG. 2 is a block diagram of a display device, in accordance with an exemplary embodiment.

A block diagram of a display device 105 is explained in detailed with reference to FIG. 2. The display device 105 is configured to receive the command from the camera based device 115 and, in response to the command to display the entities.

The display device 105 includes a bus 205 for communicating information, and a processor 210 coupled with the bus 205 for processing one or more commands transmitted by the camera based device 115. The display device 105 also includes a memory 215, for example, a random access memory (RAM) coupled to the bus 205 for storing the commands required by the processor 210. The memory 215 can be used for storing temporary information required by the processor 210. The display device 105 further includes a read only memory (ROM) 220 coupled to the bus 205 for storing static information required by the processor 210. A storage unit 225, for example, a magnetic disk, hard disk, optical disk, server, etc., can be provided and coupled to bus 205 for storing information.

The display device 105 can be coupled via the bus 205 to a display 230, for example a cathode ray tube (CRT) or liquid crystal display (LCD), plasma display and the like for displaying entities or images. An input device 235, including various keys, is coupled to the bus 205 for communicating the commands to the processor 210. In some embodiments, a cursor controller 240, for example a mouse, a trackball, a joystick, or cursor direction keys for communicating the commands to the processor 210 and for controlling cursor movement on the display 230 can also be present.

In one embodiment, the operational steps are performed by the display device 105 using the processor 210. The commands can be read into the memory 215 from a machine-readable medium, for example, the storage unit 225. In alternative embodiments, hard-wired circuitry can be used in place of or in combination with software instructions to implement various embodiments.

The term machine-readable medium can be defined as a medium providing data to a machine to enable the machine to perform a specific function. The machine-readable medium can be a storage media. Storage media can include non-volatile media and volatile media. The storage unit 225 can be a non-volatile media. The memory 215 can be a volatile media. All such media must be tangible to enable the instructions carried by the media to be detected by a physical mechanism that reads the instructions into the machine.

Examples of the machine readable medium includes, but are not limited to, a floppy disk, a flexible disk, hard disk, magnetic tape, a CD-ROM, optical disk, punchcards, papertape, a RAM, a PROM, EPROM, and a FLASH-EPROM.

The machine readable medium can also include online links, download links, and installation links providing the information to the processor 210.

The display device 105 also includes a communication interface 245 coupled to the bus 205 for enabling data communication. Examples of the communication interface 245 include, but are not limited to, an integrated services digital network (ISDN) card, a modem, a local area network (LAN) card, an infrared port, a Bluetooth port, a Zigbee port, and a wireless port.

The display device 105 receives, using the communication interface 245, the commands transmitted by the camera based device 115. The processor 210, in response to the commands, is operable to perform one or more actions on the entities or the images displayed corresponding to the commands. Examples of the one or more actions include, but are not limited to, moving the entities or the images displayed towards the right, left, top, bottom, or any diagonal thereof of the display 230. The one or more actions also include rotating the entities or the images in a clockwise direction or a counterclockwise direction.

In one embodiment, the processor 210 can be included in the camera based device 115. The processor 210 included in the camera based device 115 is operable to perform a calibration in order to capture an initial calibrated boundary of the display device 105. The processor 210 is also operable to calculate a gesture boundary, based on a gesture associated with the camera based device 115. The processor 210 is further operable to determine a gesture associated with the camera based device 115 based on a position of the gesture boundary relative to the initial calibrated boundary. The gesture may include a movement of the camera based device towards or away from the display device 105. The gesture can also include movement of the camera based device 115 towards the right, left, top, bottom, or any diagonal thereof with respect to the position of the display device 105. The gesture can further include a movement of the camera based device 115 towards the display device 105 or away from the display device 105. Further, the gesture may include rotating the entities or the images in a clockwise direction or a counterclockwise direction. Upon determining the gesture, the processor 210 is configured to transmit a command to the display device 105 using a network 110. The command is being transmitted based on the gesture.

In some embodiments, the processor 210 can include one or more processing units for performing one or more functions of the processor 210. The processing units are hardware circuitry performing specified functions.

A method of controlling a display device using a camera based device is explained in detail in conjunction with FIG. 3.

FIG. 3 is a flowchart illustrating a method of controlling a display device 105 using a camera based device 115, in accordance with one embodiment. The method starts at operation 305. At operation 310 at least one of a camera based device 115 and a display device 105 is/are configured using communication interfaces. This configuration is performed to enable communication between the camera based device 115 and the display device 105. One or more communication protocols may be used for the configuration. Further, the configuration can also include detecting a particular camera based device 115 by a display device 105 since communication between the camera based device 115 and the display device 105 may be previously established. The display device 105 can remember the camera based device 115 using a database, for example, a first database for future detections of the camera based device 115. Similarly, the camera based device 115 can remember the display device 105 when there is a previously established communication with the display device 105.

At operation 315 calibration of the camera based device 115 is enabled. The calibration includes capturing, on the camera based device 115, an initial boundary of the display device 105 to form an initial calibrated boundary with respect to a position of the display device 105. This initial calibrated boundary of the display device 105 captured on the camera based device 115 can also be referred to as a solid boundary or a fixed boundary. Scaling is used to perform the calibration. The initial calibrated boundary of the display device 105 is captured and scaled such that the boundary of the display device 105 is accommodated within a display area of the camera based device 115. One or more scaling techniques can be used for performing the calibration. Further the solid boundary can be displayed and viewed on the camera based device 115. Furthermore one or more entities or images displayed on the display device 105 are captured by the camera based device 115.

Further, at operation 320, a gesture boundary is calculated based on a gesture associated with the camera based device 115. The gesture boundary is used capture images corresponding to the gesture associated with the camera based device 115. The initial calibrated boundary is stationary and the gesture boundary can be moved with respect to the motion of the camera based device 115. The movement of the gesture boundary corresponding to the motion of the camera based device 115 is relative to the initial calibrated boundary. The motion can be performed in any axis, for example X-axis, Y-axis and Z-axis.

At operation 325 a gesture associated with the camera based device 115 is determined based on a position of the gesture boundary relative to the initial calibrated boundary. Examples of the gesture include, but are not limited to, the camera based device 115 moving towards, the right, left, top, downwards, or any diagonal thereof, with respect to the position of the display device 105. Further, the gesture can also include moving the camera based device 115 towards the display device 105 and moving the camera based device 115 away from the display device 105. Furthermore, the gesture can also include rotating the camera based device 115 in a clockwise or counterclockwise direction with respect to the position of the display device 105.

In one example, the gesture includes movement of the camera based device 115, along an axis, for example Z-axis, towards the display device 105. In such a case, the gesture boundary is scaled-up relative to the initial calibrated boundary. In another example, the gesture includes pulling the camera based device 115 away from the display device 105, along the axis. In such a case, the gesture boundary is scaled-down relative to the initial calibrated boundary.

In yet another example, the gesture includes the movement of the camera based device 115 towards the right, for example, along X axis with respect to the position of the display device 105. In such a case, the gesture boundary is moved towards left relative to the initial calibrated boundary. Further, in another example, the gesture includes the movement of the camera based device 115 towards the left with respect to the position of the display device 105. In such a case, the gesture boundary is moved towards right relative to the initial calibrated boundary.

Furthermore, in another example, the gesture includes the movement of the camera based device 115 towards the top, for example, along Y axis with respect to the position of the display device 105. In such a case, the gesture boundary is moved downwards relative to the initial calibrated boundary. Moreover, in another example, the gesture includes the movement of the camera based device 115 downwards with respect to the position of the display device 105. In such a case, the gesture boundary is moved upwards relative to the initial calibrated boundary.

Further, in one example, the gesture includes rotating the camera based device 115 in the clockwise direction along an axis, for example X-axis, Y-axis or Z-axis with respect to the position of the display device 105. In such a case, the gesture boundary is rotated in a counterclockwise direction relative to the initial calibrated boundary. Furthermore, in another example, the gesture includes rotating the camera based device 115 in the counterclockwise direction with respect to the position of the display device 105. In such a case, the gesture boundary is rotated in clockwise direction relative to the initial calibrated boundary. Similarly many other gestures can be associated with the camera based device. This enables the camera based device 115 and the display device 105 to be contrary to each other.

In some embodiments, if the user can wish to recalibrate the solid boundary, then camera based device 115 is configured to provide an option in the form of a button or menu to initiate re-detection process.

At operation 330 a command generated by the camera based device 115 based on the gesture associated with the camera based device 115 is transmitted from the camera based device 115 to the display device 105 using a network 110. The command may be transmitted using a wireless network, for example, Bluetooth, Near Field Communication (NFC), WI-FI and the like.

In one example, a zoom-in command is generated and transmitted when the camera based device 115 is moved along the axis, towards the display device 105. In another example, a zoom-out command is generated and further transmitted when the camera based device 115 is moved along the axis away from the display device 105.

In yet another example, a translate-right command is generated and transmitted when the gesture includes the movement of the camera based device 115 towards the right with respect to the position of the display device 105. In some embodiments, a gesture-boundary-left command is generated when the camera based device 115 is moved towards the right. Further, in another example, a translate-left command is generated and transmitted when the gesture includes the movement of the camera based device 115 towards the left with respect to the position of the display device 105. In some embodiments, a gesture-boundary-right command is generated when the camera based device 115 is moved towards the right.

Furthermore, in another example, a translate-top command is generated and transmitted when the gesture includes the movement of the camera based device 115 towards the top with respect to the position of the display device 105. In some embodiments, a gesture-boundary-down command is generated when the camera based device 115 is moved towards the top. Moreover, in another example, a translate-down command is generated and transmitted when the gesture includes the movement of the camera based device 115 towards the bottom with respect to the position of the display device 105. In some embodiments a gesture-boundary-top command is generated when the camera based device 105 is moved towards the bottom.

Further, in one example, rotate-clockwise command is generated and transmitted when the gesture includes rotating the camera based device 115 in the clockwise direction with respect to the position of the display device 105. In some embodiments a gesture-boundary-counterclockwise command is generated when the camera based device 115 is rotated in the clockwise direction. Furthermore, in another example, a rotate-counterclockwise command is generated and further transmitted when the gesture includes rotating the camera based device 115 in the counterclockwise direction with respect to the position of the display device 105. In some embodiments a gesture-boundary-clockwise command is generated when the camera based device 105 is rotated in the counterclockwise direction. Hence, the gesture based commands that are generated to be opposite to the movement of the gesture determined by the camera based device 115 transmitted to the display device 105 based on an application running on the display device 105. Similarly, various other commands corresponding to the gesture associated with the camera based device can be generated and transmitted.

At operation 335 the display device 105 is enabled to process the command. Processing is performed to display the one or more entities or images corresponding to the command received. In one example, if the zoom-in command is received then the entities or images displayed on the display device 105 is zoomed larger than original size of the entities or images and displayed on the display device 105. Further, if the zoom-in command is received then the entities or images displayed on the display device 105 are zoomed out to such that the entities or images appear smaller than the original size of the entities or images and are displayed on the display device 105.

In another example, if the translate-right command is received then the entities or images displayed on the display device 105 is moved towards the right and thus displayed on the display device. In some embodiments, if the gesture-boundary-left command is received, then the gesture-boundary-left command is processed by the display device 105 and further, the entities or images are moved towards the right upon processing the gesture-boundary-left command. In another example, if the translate-left command is received then the entities or images displayed on the display device 105 is moved towards the left and thus displayed on the display device 105. In some embodiments, if the gesture-boundary-right command is received, then the gesture-boundary-right command is processed by the display device 105 and further, the entities or images are moved towards the left upon processing the gesture-boundary-right command.

In yet another example, if the translate-top command is received then the entities or images displayed on the display device 105 is moved towards the top and thus displayed on the display device. In some embodiments, if the gesture-boundary-down command is received, then the gesture-boundary-down command is processed by the display device 105 and further, the entities or images are moved towards the top upon processing the gesture-boundary-down command. In yet another example, if the translate-down command is received then the entities or images displayed on the display device 105 is moved downwards and thus displayed on the display device. In some embodiments, if the gesture-boundary-top command is received, then the gesture-boundary-top command is processed by the display device 105 and further, the entities or images are moved downwards upon processing the gesture-boundary-down command.

Further, in one example, if the rotate-clockwise command is received then the entities or images displayed on the display device 105 is rotated in the clockwise direction and thus displayed on the display device. In some embodiments, if the gesture-boundary-counterclockwise command is received, then the gesture-boundary-counterclockwise command is processed by the display device 105 and further, the entities or images are rotated in the clockwise direction upon processing the gesture-boundary-counterclockwise command. Further, in another example, if the rotate-counterclockwise command is received then the entities or images displayed on the display device 105 is rotated in the counterclockwise direction and thus displayed on the display device. In some embodiments, if the gesture-boundary-clockwise command is received, then the gesture-boundary-clockwise command is processed by the display device 105 and further, the entities or images are rotated in the counterclockwise direction upon processing the gesture-boundary-clockwise command. Similarly, the display device 105 moves the entities and images corresponding to the commands received. The method stops at operation 340.

In one example, an application running on the display device 105 can be a game. The camera based device 115 captures a character of the game. If the camera based device 115 moves towards the right, then the camera based device generates the translate-right command. The display device 105 upon receiving the translate-right command moves a character of the game to the right.

In another example, if an application running on the display device 105 is a web browser. If the camera based device 115 moves towards the top, then the camera based device 115 generates the gesture-boundary-down command which scrolls a web page downwards this is also referred to as natural scrolling.

Hereinbelow is explanation on a method of controlling a display apparatus using a mobile device, with reference to FIGS. 4A to 4I. Embodiments explained in FIGS. 4A to 4I include the display apparatus 405 and mobile device 410. In one embodiment, the display apparatus 405 may be a TV, and the mobile device 410 may be a mobile phone including a camera. Herein, the mobile device 410 may capture an image using the camera. In addition, the display apparatus 405 and mobile device 410 may communicate with one another.

The mobile device 410 captures an initial boundary of the display apparatus 405 based on the position of the display apparatus 405. The mobile device 410 captures the initial boundary in order to form an initial calibration boundary and enables a calibration operation. The initial calibration boundary may be displayed in a solid line 415 as illustrated in FIG. 4A. The initial calibration boundary may be a fixed boundary. When a calibration operation is performed, the position of the initial calibration boundary is fixed on the display of the mobile device 410. The mobile device 410 also determines a gesture boundary based on at least one gesture associated with the mobile device 410. The gesture boundary may be illustrated in a rectangular format 420 of dotted lines as shown in FIG. 4A. The dotted line rectangle 420 may be changed according to movement of the mobile device 410 as it relates to the initial calibration boundary. Changing the position of the rectangle 420 with dotted lines corresponds to movement of the mobile device 410 that is relative to the initial calibration boundary. The rectangle 420 with dotted lines as it relates to the initial calibration boundary 415 is used to determine at least one gesture associated with the mobile device 410. In addition, the mobile device 410 may capture the image displayed on the display device 405 as illustrated in FIG. 4A.

In FIG. 4B, the mobile device 410 is moved to face towards the display apparatus 405 based on Z axis. When the mobile device 410 is moved to face towards the display apparatus 405, the image may get bigger. Thus, the mobile device 410 expands the rectangle 420 of dotted lines based on the initial calibration boundary in order to capture the expanded image. The mobile device 410 may sense the rectangle of dotted lines being expanded, and generates a zoon-in command in response to the movement. In addition, the zoom-in command is transmitted to the display apparatus 405. The zoom-in command may be transmitted through a wireless network such as Bluetooth, NFC, and WiFi etc. The display apparatus 405 operates to process the received zoon-in command, and expands the image in response to the zoom-in command. The expanded image is displayed on the display apparatus 405 as illustrated in FIG. 4B.

In FIG. 4C, the mobile device 410 is moved away from the display apparatus 405 based on Z axis. When the mobile device 410 is moved away from the display apparatus 405, the captured image may get smaller. Thus, the mobile device 410 reduces the rectangle 420 of dotted lines based on the initial calibration boundary in order to capture the reduced image. The mobile device 410 may sense the rectangle 420 of dotted lines being reduced, and generates a zoom-out command in response to that sensed movement. In addition, the zoom-out command is transmitted to the display apparatus 405 through the wireless network. In response to receiving the zoom-out command, the display apparatus 405 operates to process the received zoom-out command, and reduces the image in response to the zoom-out command. The reduced image is displayed on the display apparatus 405 as illustrated in FIG. 4C.

In FIG. 4D, the mobile device 410 is moved relatively left regarding the position of the display apparatus 405 based on the X axis. When the mobile device 410 is moved to the left of the display apparatus 405, the image captured by the mobile apparatus 410 may be moved to the right. Thus, in order to capture the image being moved to the right in response to the movement of the mobile device 410, the mobile device 410 moves the rectangle 420 of dotted lines to the right based on the initial calibration boundary. The mobile device 410 may sense the movement of the rectangle 420 of the dotted lines, and generates a left command in response to the movement. In addition, the left command is transmitted to the display apparatus 405. In response to receiving the left command, the display apparatus 405 operates to process the received left command, and moves the image. As illustrated in FIG. 4D, the image is moved to the left and displayed on the display apparatus 405. In one embodiment, a command to move the gesture boundary to the right may be generated when the mobile device 410 is moved to the left. In addition, the command to move the gesture boundary to the right may be processed by the display apparatus 405 in order to move the image to the left.

In FIG. 4E, the mobile device 410 is moved relatively to the right regarding the position of the display apparatus 405 based on the X axis. When the mobile device 410 is moved to the right of the display apparatus 405, the image captured by the mobile device 410 may be moved to the left. Therefore, in order to capture the image being moved to the left in response to the movement of the mobile device 410, the mobile device 410 moves the rectangle 420 of dotted lines to the left based on the initial calibration boundary. The mobile device 410 may sense the movement of the rectangle 420 of the dotted lines, and generates the right command in response to the movement.

In addition, the right command may be transmitted to the display apparatus 405.

In response to receiving the right command the display apparatus 405 operates to process the received right command, and moves the image. As illustrated in FIG. 4E, the image moved to the right is displayed on the display apparatus 405. In one embodiment, the command to move the gesture boundary to the left may be generated when the mobile device 410 moved to the right. In addition, the command to move the gesture boundary to the left may be processed by the display apparatus 405 in order to move the image to the right.

In FIG. 4F, the mobile device is moved relatively downward regarding the position of the display apparatus 405 based on the Y axis. When the mobile device 410 is moved relatively downwards from the display apparatus 405, the image captured by the mobile device 410 may be moved upwards. Thus, the mobile device 410 moves the rectangle 420 of dotted lines upwards based on the initial calibration boundary in order to capture the image being moved upwards in response to the movement of the mobile device 410. The mobile device 410 may sense the movement of the rectangle 420 of dotted lines, and generates a downward command in response to the movement. In addition, the downward command is transmitted to the display apparatus 405. In response to receiving the downward command the display apparatus 405 operates to process the received downward command, and moves the image. As illustrated in FIG. 4F, the image moved downwards is displayed on the display apparatus 405. In one embodiment, the command to move the gesture boundary upwards may be generated when the mobile device 410 is moved downwards. In addition, the command to move the gesture boundary upwards may be processed by the display apparatus 405 in order to move the image downwards.

In FIG. 4G, the mobile device 410 is moved relatively upwards regarding the position of the display apparatus 405 based on the Y axis. When the mobile device 410 is moved upwards from the display apparatus 405, the image captured by the mobile device 410 may be moved downwards. Thus, the mobile device 410 moves the rectangle 420 of dotted lines downwards based on the initial calibration boundary in order to capture the image being moved downwards in response to the movement of the mobile device 410. The mobile device 410 may sense the movement of the rectangle 420 of the dotted lines, and generates an upwards command in response to the movement. In addition, the upwards command is transmitted to the display apparatus 405. In response to receiving the upwards command the display apparatus 405 operates to process the received upwards command, and moves the image. As illustrated in FIG. 4G, the image moved upwards is displayed on the display apparatus 405. In one embodiment, the command to move the gesture boundary downwards may be generated when the mobile device 410 moved upwards. In addition, the command to move the gesture boundary downwards may be processed by the display apparatus 405 in order to move the image upwards.

In FIG. 4H, the mobile device 410 is rotated clockwise regarding the position of the display apparatus 405 based on the Z axis. When the mobile device 410 is rotated clockwise from the display apparatus 405, the image captured by the mobile device 410 may be rotated counterclockwise by the mobile device 410. Thus, in order to capture the image being rotated counterclockwise in response to the movement of the mobile device 410, the mobile device 410 rotates the rectangle 420 of dotted lines counterclockwise based on the initial calibration boundary. The mobile device 410 may sense the movement of the rectangle 420 of dotted lines, and generates a clockwise rotation command in response to the movement. In addition, the clockwise rotation command is transmitted to the display apparatus 405. In response to receiving the clockwise rotation command the display apparatus 405 operates to process the received clockwise rotation command, and rotates the image. As illustrated in FIG. 4H, the image rotated clockwise is displayed on the display apparatus 405. In one embodiment, the command to rotate the gesture boundary counterclockwise may be generated when the mobile device 410 is rotated clockwise. In addition, the command to rotate the gesture boundary counterclockwise may be processed by the display apparatus 405 in order to process the image clockwise.

In FIG. 4I, the mobile device 410 is rotated counterclockwise regarding the position of the display apparatus 405 based on the Z axis. When the mobile device 410 is rotated counterclockwise from the display apparatus 405, the image captured by the mobile device 410 may be rotated clockwise. Thus, in order to capture the image being rotated clockwise in response to the movement of the mobile device 410, the mobile device 410 rotates the rectangle 420 of dotted lines clockwise based on the initial calibration boundary. The mobile device 410 may sense the movement of the rectangle 420 of dotted lines, and generates a counterclockwise rotation command in response to the movement. In addition, the mobile device 410 may sense the movement of the rectangle 420 of dotted lines, and generates a counterclockwise rotation command in response to the movement. In addition, the counterclockwise rotation command is transmitted to the display apparatus 405. In response to receiving the counterclockwise rotation command the display apparatus 405 operates to process the received counterclockwise rotation command, and rotates the image.

As illustrated in FIG. 4I, the image rotated counterclockwise is displayed on the display apparatus 405. In one embodiment, the command to rotate the gesture boundary clockwise may be generated when the mobile device 410 rotates counterclockwise. In addition, the command to rotate the gesture boundary clockwise may be processed by the display apparatus 405 in order to process the image counterclockwise.

Figure 5:
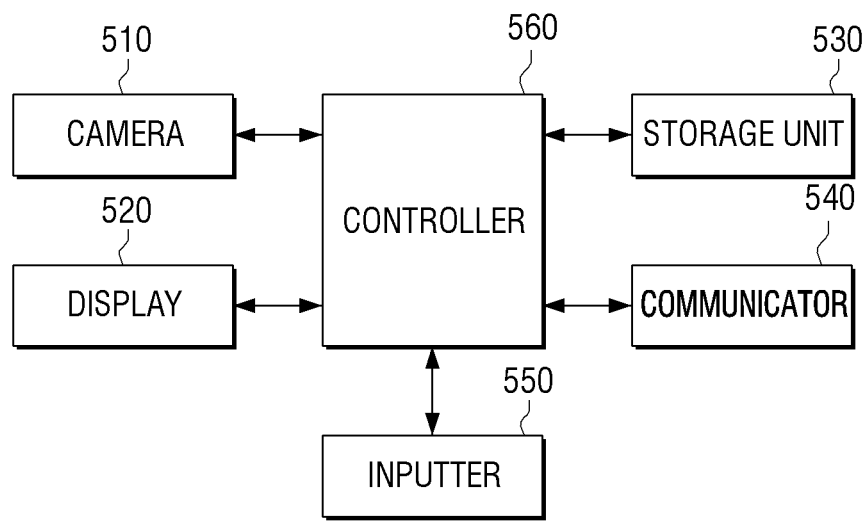
FIG. 5 is a block diagram illustrating a configuration of a mobile device, in accordance with an exemplary embodiment.

Hereinbelow is a detailed explanation of a mobile device in accordance with one embodiment of the present disclosure with reference to FIG. 5. As illustrated in FIG. 5, the mobile device 115 includes a camera 510, display 520, storage unit 530, communicator 540, inputter 550 and controller 560. Herein, the mobile device 115 may be a smart phone, but this is merely an embodiment, and thus the mobile device 115 may be embodied as another type of mobile device (for example, PDA, tablet PC, digital camera etc.) which includes a camera.

The camera 510 photographs an external image. Especially, the camera 510 may photograph an entity or image displayed on the display apparatus 105.

The display 520 displays image data by control by the controller 560. Especially, the display 520 may display an image photographed by the camera 510. In addition, the display 520 may display an initial calibration boundary and gesture boundary in order to sense the movement of the captured entity. Herein, the initial calibration boundary is a solid fixed line, and the gesture boundary is a line which moves or of which the area size changes according to the movement of the captured entity.

The storage unit 530 stores various data and programs for the controller 560 used to control the mobile device 115.

The communicator 540 performs communication with an external device. Especially, in order to control the display apparatus 105, the communicator 540 may transmit a control signal generated by the controller 560 to the display apparatus 105.

The inputter 550 receives a user command for controlling the mobile device 115. Herein, the inputter 550 may be a touch screen, a button etc., but is not limited thereto, and thus may be various input devices such as a key board, joystick, mouse, etc.

The controller 560 controls the overall operations of the mobile device 115 according to the user command input by the inputter 550. Especially, the controller 560 captures an entity of the display apparatus 105 through the camera 510, senses the movement of the entity captured according to the movement of the mobile device 115, and controls the communicator 540 to generate a control signal based on the movement of the sensed entity to transmit the generated control signal to the display apparatus 105.

More specifically, the controller may control the display 520 to display an initial gradation line and a gesture gradation line regarding the displayed entity while the camera 510 captures the entity displayed on the display apparatus 105.

Herein, the controller 560 determines at least one of the movement and change of size of the gesture gradation line regarding the initial calibration line to sense at least one of the movement and change of size of the captured entity. For example, in a case where the gesture gradation line moved to the left regarding the initial calibration gradation line, the controller 560 may determine that the movement of the captured entity moved to the left. In addition, in a case where the size of the gesture gradation line regarding the initial calibration gradation line increased, the controller 560 may determine that the size of the captured entity increased.

In addition, the controller uses at least one of the movement and change of size of the sensed entity to generate a control signal for changing at least one of the size and position of the entity displayed on the display apparatus 105. More specially, in a case where the size of the captured entity changed, the controller 560 may generate a control signal for changing the size of the entity displayed on the display apparatus 105 according to the change of size of the captured entity. For example, in a case where the size of the captured entity increased according to the movement of the mobile device 115 moving towards the display apparatus 105, the controller 560 may generate control signal for increasing the size of the entity displayed on the display apparatus 105. In addition, in a case where the size of the captured entity decreased according to the movement of the mobile device 115 away from the display apparatus 105, the controller 560 may generate a control signal for reducing the size of the entity displayed on the display apparatus 105.

In addition, when the position of the captured entity changed, the controller 560 may generate a control signal for changing the position of the entity displayed on the display apparatus 105 according to the change of position of the captured entity. Herein, the controller 560 may generate a control single to move the entity displayed on the display apparatus 105 in an opposite direction of the movement of the gesture gradation line regarding the initial calibration gradation line. For example, when the gestured gradation line moved to the left regarding the initial calibration gradation line, the controller 560 may generate a control signal to the entity displayed on the display apparatus 105 to the right.

Figure 6:
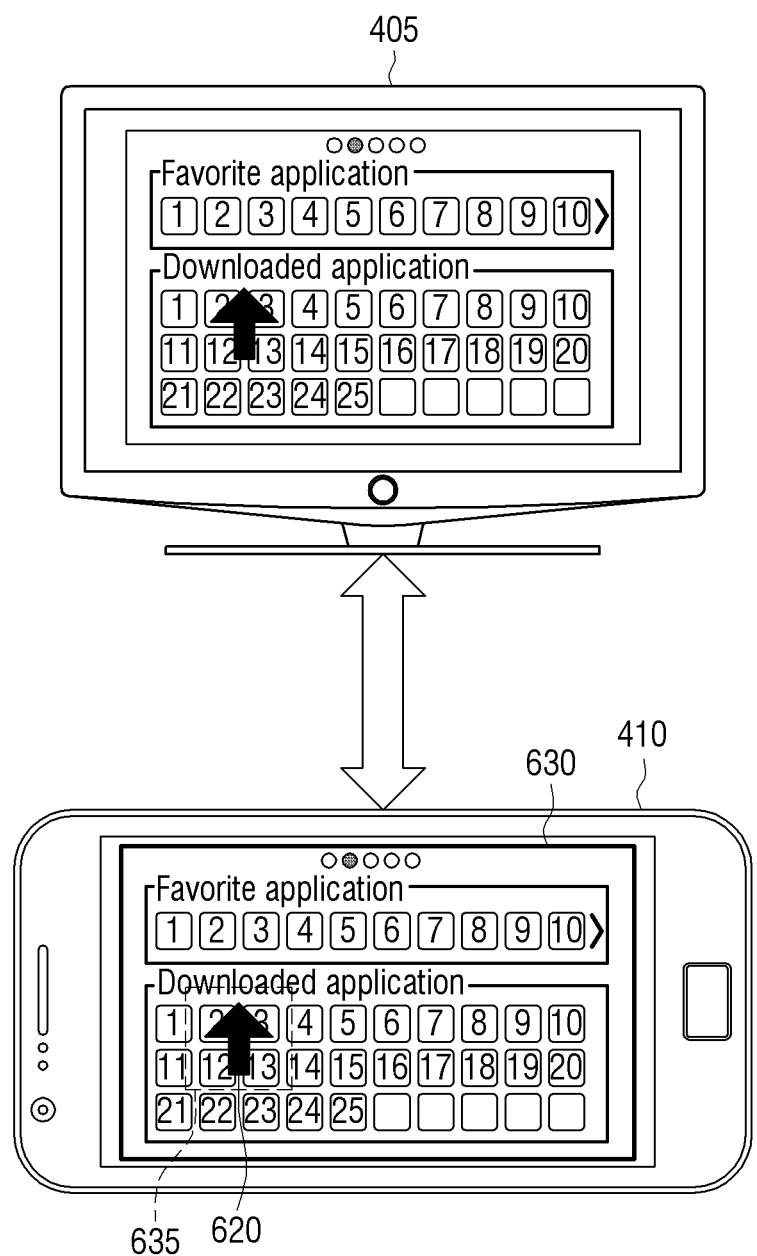
FIG. 6 is a view for explaining an embodiment of controlling a pointer displayed on a display device using a mobile device, in accordance with another exemplary embodiment.

In the aforementioned embodiments, the entities displayed on the display apparatus 105 are explained to be objects inside the image, but this is merely an embodiment, and thus the entity displayed on the display apparatus 105 may be a pointer used to control the display apparatus 105 as illustrated in FIG. 6.

As aforementioned, by various embodiments of the present disclosure, the user may control a display apparatus using a mobile apparatus where a camera function is embedded. Especially, as the entity of the display apparatus is moved according to the movement of the camera based device, the user becomes intuitively able to control the display apparatus.

Although a few exemplary embodiments have been shown and described, it will be appreciated by those skilled in the art that changes may be made in the exemplary embodiments without departing from the principles and spirit of the inventive concept, the scope of which is defined in the claims and their equivalents.

What is claimed is:

1. A method of controlling a display apparatus of a system which includes a mobile device and display apparatus, the method comprising:
   displaying an entity by the display apparatus;
   capturing, by the mobile device, the entity displayed on the display apparatus;
   sensing, by the mobile device at least one of a movement of the captured entity and a change of size of the captured entity according to a movement of the mobile device;
   generating, by the mobile device, a first control signal based on the least one of the movement of the captured entity and the change of size of the captured entity, the control signal controlling the display apparatus;
   controlling, by the display apparatus, at least one of the size and position of the displayed entity according to the first control signal;
   in response to a size of the captured entity being changed, generating, by the mobile device, a second control signal to change a size of the entity displayed on the display apparatus and changing, by the display apparatus the size of the entity displayed on the display apparatus according to the second control signal; and
   in response to a position of the captured entity being changed, generating, by the mobile device, a third control signal to change a position of the entity displayed on the display apparatus and changing, by the display apparatus, the position of the entity displayed on the display apparatus according to the third control signal.

2. A device comprising:
   a display configured to displays a first image which is a mirror image of a second image displayed on the second device;
   a sensor configured to sense a movement of the device relative to the second device;
   a processor configured to generate a control signal for controlling the second device to move the second image, in response to the sensor sensing the movement of the device;
   a transmitter configured to transmit the control signal to the second device;
   wherein, in response to a size of the first image being changed, the processor generates a control signal for controlling the second device to change a size of the second image according to the change of size of the first image; and
   wherein, in response to a position of the first image being changed, the processor generates a control signal for controlling the second device to change a position of the second image according to the change of position of the first image.

3. A method of controlling a display apparatus controlled by a mobile device, the method comprising:
   displaying an entity;
   receiving, from the mobile device, a first control signal which is generated based a movement of the mobile device relative to the display apparatus and indicates a movement of the displayed entity as it relates to the movement of the mobile device;
   controlling at least one of a size and a position of the displayed entity according to the first control signal;
   receiving, from the mobile device, a second control signal to change a size of the entity being displayed on the display apparatus in response to a change of a size of the captured entity, and changing the size of the entity displayed on the display apparatus according to the second control signal; and
   receiving, from the mobile device, a third control signal to change a position of the entity displayed on the display apparatus in response to a position of the captured entity being changed, and changing the position of the entity displayed on the display apparatus according to the third control signal.

4. A method for controlling a display apparatus with a mobile device, the method comprising:
   capturing an entity which is displayed on the display apparatus;
   in response to a movement of the mobile device, sensing at least one of a movement of the captured entity and a change of size of the captured entity;
   generating a control signal for controlling the display apparatus based on the at least one of the movement of the captured entity and the change of size of the sensed entity;
   transmitting the generated control signal to the display apparatus;
   in response to a size of the captured entity being changed, changing with the control signal a size of the entity displayed on the display apparatus according to the change of the size of the captured entity; and
   in response to a position of the captured entity being changed, changing with the control signal a position of the entity displayed on the display apparatus according to the change of the position of the captured entity.

5. The method according to claim 4,
   wherein the capturing the entity comprises:
      displaying an initial calibration gradation line; and
      displaying a gesture gradation line associated with the entity displayed on the display apparatus.

6. The method according to claim 5, further comprising moving the gesture gradation line according to the movement of the mobile device.

7. The method according to claim 6, wherein the sensing comprises determining at least one of a movement and a change of size of the gesture gradation line with respect to the initial calibration gradation line.

8. The method according to claim 4, further comprising:
   in response to the size of the captured entity being increased according to the movement of the mobile device towards the display apparatus, increasing with the control signal the size of the entity displayed on the display apparatus; and
   in response to the size of the captured entity being decreased according to the movement of the mobile device away from the display apparatus, decreasing with use of the control signal the size of the entity displayed on the display apparatus.

9. The method according to claim 4, wherein the control signal causes the entity displayed on the display apparatus to move in a direction which is opposite to the movement of the gesture gradation line as it relates to the initial calibration gradation line.

10. The method according to claim 4, wherein the entity displayed on the display apparatus includes a pointer.

11. A mobile device for controlling a display apparatus, the mobile device comprising:
- a camera which is configured to capture an entity displayed on the display apparatus;
- a display which is configured to display the entity captured by the camera;
- a communicator which is configured to communicate with the display apparatus; and
- a controller which is configured to control the camera to capture the entity displayed on the display apparatus, sense a movement of the captured entity according to a movement of the mobile device, generate a control signal based on the sensed movement of the captured entity, and control the communicator to transmit the generated control signal to the display apparatus;
- wherein, in response to a size of the captured entity being changed, the controller is further configured to generate a control signal to change a size of the entity displayed on the display apparatus according to the change of the size of the captured entity, and
- in response to a position of the captured entity being changed, the controller is further configured to generate the control signal to change a position of the entity displayed on the display apparatus. apparatus according to the change of the size of the captured entity.

12. The mobile device according to claim 11, wherein the controller is further configured to control the display to display an initial calibration gradation line and a gesture gradation line, the gesture gradation line being associated with the entity displayed on the display while the camera captures the entity of the display apparatus.

13. The mobile device according to claim 12, wherein the gesture gradation line moves according to the movement of the mobile device.

14. The mobile device according to claim 13, wherein the controller is further configured to determine at least one of the movement and a change of size of the gesture gradation line with respect to the initial calibration gradation line in order to sense at least one of the movement and a change of size of the captured entity 15. The mobile device according to claim 11, wherein, in response to the size of the captured entity being increased according to the movement of the mobile device towards the display apparatus, the controller is further configured to generate the control signal to increase the size of the entity displayed on the display apparatus, and
in response to the size of the captured entity being decreased according to the movement of the mobile device away from the display apparatus, the controller is further configured to generate the control signal to decrease the size of the entity displayed on the display apparatus.

16. The mobile device according to claim 11, wherein the controller is further configured to generate the control signal to move the entity displayed on the display apparatus in a direction which is opposite to the movement of the gesture gradation line with respect to the initial calibration gradation line.

17. The mobile device according to claim 11, wherein the entity displayed on the display apparatus includes a pointer.

* * * * *